United States Patent
Brück et al.

(10) Patent No.: US 7,380,395 B2
(45) Date of Patent: Jun. 3, 2008

(54) EXHAUST GAS SYSTEM

(75) Inventors: Rolf Brück, Bergisch Gladbach (DE);
Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 11/135,039

(22) Filed: May 23, 2005

(65) Prior Publication Data
US 2005/0229590 A1   Oct. 20, 2005

Related U.S. Application Data

(63) Continuation of application No. PCT/EP2003/011808, filed on Oct. 24, 2003.

(30) Foreign Application Priority Data
Nov. 22, 2002   (DE) .............................. 102 54 764

(51) Int. Cl.
*F01N 3/00*   (2006.01)
(52) U.S. Cl. .............. 60/286; 60/295; 60/297; 60/303; 60/311
(58) Field of Classification Search .......... 60/286, 60/295, 297, 303, 311; 55/DIG. 30
See application file for complete search history.

(56) References Cited

U.S. PATENT DOCUMENTS

| | | | |
|---|---|---|---|
| 5,052,178 A * | 10/1991 | Clerc et al. ............. | 60/274 |
| 5,746,989 A * | 5/1998 | Murachi et al. ........ | 423/213.7 |
| 5,839,273 A * | 11/1998 | Maus ..................... | 60/286 |
| 6,023,930 A * | 2/2000 | Abe et al. .............. | 60/311 |
| 6,314,722 B1 * | 11/2001 | Matros et al. .......... | 60/274 |
| 6,449,947 B1 * | 9/2002 | Liu et al. ............... | 60/286 |
| 6,601,385 B2 * | 8/2003 | Verdegan et al. ....... | 60/286 |
| 6,725,651 B2 * | 4/2004 | Itoh et al. ............... | 60/286 |
| 6,808,688 B1 * | 10/2004 | Saito et al. ............. | 422/177 |
| 6,823,663 B2 * | 11/2004 | Hammerle et al. ..... | 60/286 |
| 6,863,874 B1 * | 3/2005 | Twigg .................... | 423/210 |
| 6,877,313 B1 * | 4/2005 | Phillips et al. ......... | 60/286 |
| 6,915,629 B2 * | 7/2005 | Szymkowicz .......... | 60/289 |
| 6,928,806 B2 * | 8/2005 | Tennison et al. ....... | 60/286 |
| 2002/0054843 A1 * | 5/2002 | Maunula ................. | 423/213.5 |
| 2002/0056273 A1 | 5/2002 | Itoh et al. | |
| 2003/0072694 A1 | 4/2003 | Hodgson et al. | |
| 2003/0086837 A1 | 5/2003 | Bruck et al. | |

(Continued)

FOREIGN PATENT DOCUMENTS

DE   42 03 807 A1   8/1993

(Continued)

*Primary Examiner*—Thomas Denion
*Assistant Examiner*—Diem Tran
(74) *Attorney, Agent, or Firm*—Laurence A. Greenberg; Werner H. Stemer; Ralph E. Locher

(57) ABSTRACT

An exhaust gas system for converting harmful substances of an exhaust gas of a mobile internal combustion engine includes at least one reducing agent feed, a catalytic converter, a filter element and an exhaust pipe. The reducing agent feed opens into the exhaust pipe upstream of the filter element, while the catalytic converter is disposed downstream of the filter element, as seen in exhaust gas flow direction. Additional components, such as a mixer, a pre-catalytic converter and a heating element, etc. used for purifying exhaust gas, may also be advantageously integrated into the system.

16 Claims, 2 Drawing Sheets

U.S. PATENT DOCUMENTS

2003/0097934 A1    5/2003    Bruck et al.
2004/0013580 A1    1/2004    Bruck et al.
2004/0221572 A1    11/2004    Treiber

FOREIGN PATENT DOCUMENTS

| | | |
|---|---|---|
| DE | 201 17 659 U1 | 2/2002 |
| DE | 201 17 873 U1 | 3/2002 |
| EP | 0 487 886 B1 | 6/1992 |
| WO | 01/80978 A1 | 11/2001 |
| WO | 01/92692 A1 | 12/2001 |
| WO | 02/00326 A2 | 1/2002 |

\* cited by examiner

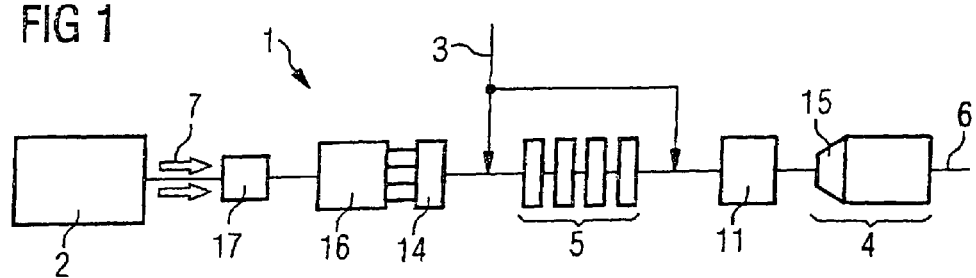
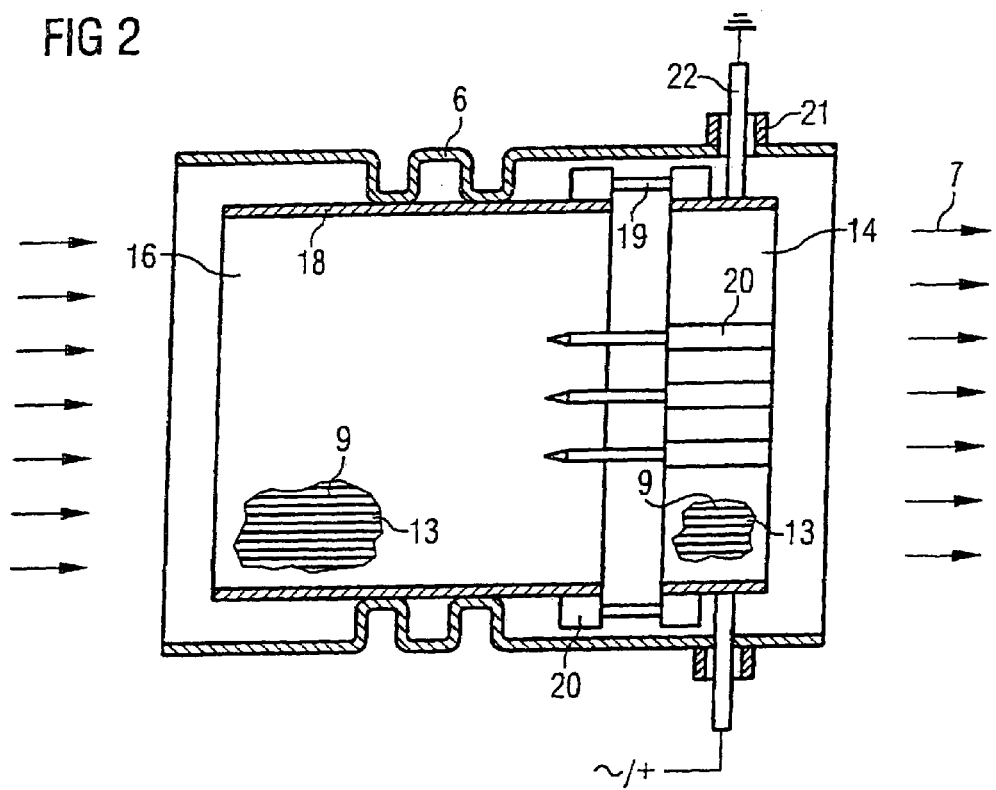

EXHAUST GAS SYSTEM

CROSS-REFERENCE TO RELATED APPLICATIONS

This is a continuing application, under 35 U.S.C. § 120, of copending International Application No. PCT/EP2003/011808, filed Oct. 24, 2003, which designated the United States; this application also claims the priority, under 35 U.S.C. § 119, of German Patent Application 102 54 764.5, filed Nov. 22, 2002; the prior applications are herewith incorporated by reference in their entirety.

BACKGROUND OF THE INVENTION

Field of the Invention

The present invention relates to an exhaust gas system for converting pollutants in an exhaust gas from a mobile internal combustion engine. The exhaust gas system includes at least one exhaust pipe having at least one reducing agent feed, at least one catalytic converter and at least one filter element. Such exhaust gas systems are preferably used to purify exhaust gases from diesel engines used in the automotive industry.

During the combustion of hydrocarbons in an internal combustion engine (e.g. a diesel or spark-ignition engine), in addition to the main combustion products, namely carbon dioxide and water vapor, byproducts, which are in some cases undesirable, are also formed. Those byproducts are in particular carbon particulates and nitrogen oxides. The level of nitrogen oxides is dependent both on the combustion process management (temperatures, cycle times, etc.) as well as on the air/fuel ratio of the combustion mixture. If the levels of air are substoichiometric, the exhaust gas contains relatively large amounts of carbon dioxide and hydrocarbons. However, if the air is superstoichiometric, the carbon dioxide and hydrocarbons are almost completely oxidized. The nitrogen oxides content in an exhaust gas passes through a maximum in the region of slightly lean mix compositions. However, it is in that range that the specific consumption is at an optimum for internal combustion engines, in particular for spark-ignition engines. Therefore, if in particular spark-ignition engines are set for an optimally low consumption, there may also be high concentrations of $NO_x$ in the exhaust gas.

In order to lower the $NO_x$ content in the exhaust gas from an internal combustion engine, the selective catalytic reduction of $NO_x$ (SCR: Selective Catalytic Reaction) in oxygen-containing exhaust gases using urea and a reduction catalyst, is known, for example, from European Patent 0 487 886 B1. The urea is quantitatively hydrolyzed to form ammonia and carbon dioxide, before it comes into contact with the reduction catalyst, which is provided in the form of a catalytic converter. The use of urea has the advantage that there is no need for ammonia to be carried in motor vehicles and for ammonia to be made available at refueling stations, which entails the corresponding need for safety precautions. One problem with using urea as a reducing agent is that if urea is injected directly, upstream of the catalytic converter, undesirable reaction products may form.

In order to avoid that problem, German Published, Non-Prosecuted Patent Application DE 42 03 807 A1 proposes an apparatus for the catalytic reduction of nitrogen oxides. The apparatus has a catalytic converter and a feed device which sprays liquid urea finely onto an evaporator disposed upstream of the catalytic converter.

The evaporator is constructed in the form of a flow mixer, with the intention being to increase the efficiency of the decomposition of urea. The evaporator constructed as a flow mixer, which is referred to below as a "mixer", is preferably, according to German Published, Non-Prosecuted Patent Application DE 42 03 807 A1, to be constructed in such a way that swirling and radial and/or tangential flow components are produced within the mixer, so that the transfer of heat from the exhaust gas to the urea solution is completed as quickly and completely as possible. Furthermore, the intention is to achieve as uniform as possible a distribution of the urea solution and the gases formed therefrom over the entire cross section of the mixer and a hydrolysis catalytic converter disposed downstream of the mixer.

In addition to the conversion of nitrogen oxides, in particular in the case of diesel engines, the reduction of particulate emissions is also a primary objective. A large number of different constructions relating to particulate traps, which are regenerated continuously (CRT) or discontinuously, are known for that purpose. In addition to chemical interactions with additives and special coatings, the reliable regeneration of the filter element in the exhaust gas system still continues to present a problem. It is necessary to regenerate the particulate trap since the increase in accumulation of the particulates in passage walls through which gases flow results in an increasing dynamic pressure of the exhaust gas upstream of the particulate trap, which has an adverse affect on engine performance. The regeneration includes, for example, the intermittent, brief heating of the particulate trap or the particulates which have accumulated therein, so that the carbon particulates are converted into gaseous constituents. However, that high thermal loading of the particulate trap has adverse affects on the service life thereof. In order to avoid such a discontinuous regeneration, which is very conducive to thermal wear, a system for continuous regeneration (CRT) has been developed. In a system of that type, the particulates are burnt even at temperatures of only above 200° C., through the use of oxidation with $NO_2$. The $NO_2$ required for that purpose is generated, for example, by an oxidation catalytic converter which is disposed upstream of the particulate trap. In that context, however, in particular with regard to the application in motor vehicles using diesel fuel, the problem arises that, due to the excess of air which is usually present, only an insufficient portion of nitrogen monoxide (NO) is present in the exhaust gas and can be converted into the desired nitrogen dioxide ($NO_2$). Consequently, it has not heretofore been possible to ensure continuous regeneration of the particulates trap in the exhaust gas system.

SUMMARY OF THE INVENTION

It is accordingly an object of the invention to provide an exhaust gas system for converting pollutants in an exhaust gas from a mobile internal combustion engine, which has a simple structure, effectively reduces the nitrogen oxide and particulate emissions and overcomes the hereinafore-mentioned disadvantages of the heretofore-known devices of this general type.

With the foregoing and other objects in view there is provided, in accordance with the invention, an exhaust gas system for converting pollutants in an exhaust gas from a mobile internal combustion engine. The exhaust gas system comprises an exhaust pipe conducting the exhaust gas from the mobile internal combustion engine in an exhaust gas flow direction. A filter element is connected in the exhaust pipe. At least one reducing agent feed includes a feed which opens into the exhaust pipe upstream of the filter element, as seen in the exhaust gas flow direction. A catalytic converter is connected in the exhaust pipe downstream of the filter element, as seen in the exhaust gas flow direction.

The catalytic converter preferably has a catalytically active coating (SCR catalyst: e.g. vanadium pentoxide) which promotes the selective catalytic reaction.

Whereas the majority of the known exhaust gas systems use a very large number of different components to convert the pollutants in the exhaust gas, this simple structure, which includes just three components within an exhaust gas system, achieves amazing results with regard to the conversion of pollutants. It has been possible to demonstrate this in a wide range of technically complex tests. The surprising effectiveness of this exhaust gas system resides in the fact that a dynamic pressure, which causes such a turbulent flow that the reducing agent which is added is excellently distributed, is formed even upstream of the filter element (in particular with passages that are closed on one side). In comparative tests, it has been found that other components for converting the pollutants (e.g. catalytic converters, adsorbers, etc.) cause a lower dynamic pressure, with the result that it has not been possible to record comparable results. It is only the use of an additional mixer which has been able to achieve a similarly good distribution of the reducing agent in the exhaust gas, but that has only a single function, namely that of distributing the reducing agent. By contrast, the filter element also performs the role of collecting and/or converting entrained particulates (such as for example carbon, sulfates, etc.) contained in the exhaust gas.

In accordance with another feature of the invention, the reducing agent feed is a delivery device for introducing solid urea into the exhaust pipe. This means that in this case it is not liquid and/or gaseous urea that is introduced through the use of a nozzle or a valve, but rather particles of solid urea are added to the exhaust gas stream upstream of the filter element. The urea particles are preferably of a size of from 0.1 mm to 1.3 mm and are brought into contact with the exhaust gas stream relatively closely (for example at a distance of no greater than 30 cm, in particular 10 cm) upstream of the filter element. The dynamic pressure which builds up upstream of the filter element or the turbulent flow which is present there in turn leads to the urea particles being distributed. However, this also gives rise to the additional effect whereby the urea particles adhere or are accumulated in subregions of the filter element, with the result that the urea particles and particulates that are to be filtered out (in particular if they are of approximately the same particle size) accumulate in the same cavities and at the same surfaces of the filter element, thereby creating conditions which are particularly favorable for the conversion of, for example, carbon particulates. In this context, it is very particularly advantageous for the filter element to be coated with a catalytically acting SCR coating.

In accordance with a further feature of the invention, the filter element includes a plurality of disk-like, in particular metallic, honeycomb bodies. The disk shape results from the axial length of the honeycomb bodies being significantly smaller than the diameter thereof. Placing a plurality of (in particular 3 to 6) disk-like honeycomb bodies in succession in the flow direction of the exhaust gas forms gaps between the honeycomb bodies, which have a positive effect on the generation of turbulent exhaust-gas flows. In this context, by way of explanation, it should be noted that a virtually laminar flow is formed even after relatively short flow paths (from approximately 2 cm) within the honeycomb body. By contrast, in particular the entry of the exhaust gas into the honeycomb body (or the dynamic pressure building up upstream thereof) and the exit of the exhaust gas from the passages are of importance to the swirling effect, since it is there that the laminar flow becomes detached again at the edges of the gas outlet side.

In accordance with an added feature of the invention, there is provided at least one metallic honeycomb body with at least partially structured sheet-metal layers, at least some of the sheet-metal layers having microstructures. It is attempted with the aid of the microstructures to prevent a laminar flow from forming in the interior of the honeycomb body or over the axial length of the passages. The term microstructures is to be understood as meaning, for example, elevations, openings, vanes, flow-guiding surfaces, studs, detachment edges or the like. The microstructures are distinguished in particular by the fact that they are small in relation to the diameter of the passage, in particular covering less than 60% of the cross section of the passage.

In accordance with an additional feature of the invention, the filter element is metallic and uncoated. In this context, it is preferable for the filter element to have structures in the flow passages which generate swirling, calming and/or dead zones. These structures are to be configured in such a way that the filter element is nevertheless open. A filter element is described as "open" if in principle particles can pass all the way through it, specifically including particles which are considerably larger than the particulates that are actually to be filtered out. As a result, a filter element of this type cannot become blocked even in the event of an agglomeration of particulates during operation. A suitable method for measuring the "openness" of a filter element is, for example, the test to determine up to what diameter of spherical particles can still pass through a filter of this type. In present applications, a filter element is described as "open" in particular if spheres with a diameter of greater than or equal to 0.1 mm can still pass through it, preferably spheres with a diameter of over 0.2 mm. This has the advantage that the filter element does not become blocked in the same way as a conventional filter system (with passages which are alternately closed on one side), is simple to produce and is easy to regenerate. "Open" filter elements of this type are known, for example, from German Utility Model DE 201 17 873 U1, corresponding to U.S. Patent Application Publication No. U.S. 2004/0013580; German Utility Model DE 201 17 659 U1, corresponding to U.S. Patent Application Publication No. U.S. 2004/0221572; International Publication No. WO 02/00326, corresponding to U.S. Patent Application Publication No. U.S. 2003/097934 and to U.S. Pat. No. 6,712,884; International Publication No. WO 01/92692, corresponding to U.S. Patent Application Publication No. U.S. 2003/086837; and International Publication No. WO 01/80978, corresponding to U.S. Patent Application Publication No. U.S. 2003/0072694, the content of the disclosure of which is hereby fully incorporated into the subject matter of the present application.

Under certain circumstances, however, it may nevertheless be necessary to ensure an additional fine distribution of the reducing agent for certain application areas. In accordance with yet another feature of the invention, for this purpose, it is proposed that at least one mixer be disposed upstream and/or downstream of the filter element, as seen in the flow direction of the exhaust gas. The mixer is preferably positioned downstream of the reducing agent feed. If the mixer is positioned upstream of the reducing agent feed, the result is that the exhaust gas which is passed to the reducing agent feed has already been swirled up. In this case, when the reducing agent is introduced (in solid, liquid and/or gas form), it is immediately swirled up and very intimately mixed with the exhaust gas. In the other case, the mixer is connected downstream of the filter element, in which case the latter can be of significantly shorter and/or lower-volume configuration due to the prior mixing effected by the filter element. The latter alternative is advantageous, for example, with a view to the catalytically active material used in the SCR catalytic converter. Nevertheless, a significantly low pressure loss is recorded in the combination of the filter element and the shortened mixer.

In accordance with yet a further feature of the invention, the at least one mixer is made from a material that is able to withstand high temperatures and be uncoated. Examples of suitable materials that are able to withstand high temperatures include, for example, chromium-containing and/or aluminum-containing steel foils. Due to the fact that this material is uncoated, the mixer primarily performs one single main function, namely that of mixing reducing agent with the exhaust gas, and can be produced at relatively low cost.

In accordance with yet an added feature of the invention, alternatively, the at least one mixer is made from a material that is able to withstand high temperatures and has a coating which promotes hydrolysis. In order to sufficiently accelerate the evaporation/hydrolysis and to avoid the formation of undesirable byproducts, all of the components which come into contact with the urea, in particular the passage walls of the mixers, are coated with inorganic oxides in fine-particle forms. The inorganic oxides have to be resistant to the exhaust gas at temperatures of up to 900° C., and their pore structure has to remain stable over several thousand operating hours. Therefore, it is preferable to use mixtures of aluminum oxide with titanium dioxide, silicon dioxide, zirconium dioxide and/or H-zeolites.

In accordance with yet an additional feature of the invention, alternatively, at least one mixer made from the material that is able to withstand high temperatures has a coating which is suitable for the selective catalytic reaction. It is very particularly preferred for the mixer to have a catalytically active coating which promotes both hydrolysis and the selective catalytic reaction. In this respect, in particular the use of metal oxide mixtures with H-zeolite is proposed, resulting in the advantage that the downstream SCR catalytic converter can be reduced by 10 to 30% in terms of its volume or catalytically active surface area.

In accordance with again another feature of the invention, the at least one mixer has at least partially structured sheet-metal layers, which are disposed in such a way as to form passages which are open such that an exhaust gas can flow through them. When constructing an "open" mixer, fundamentally the same criteria are to be applied as have already been described above with regard to the filter element. To this extent, reference is made to the corresponding explanation.

When using filter elements, the regeneration of these filter elements fundamentally represents a considerable problem. Therefore, in accordance with again a further feature of the invention, there is provided a heating element disposed upstream of the reducing agent feed. The purpose of the heating element is to continuously or discontinuously heat the exhaust gas to a temperature which ensures regeneration of the downstream filter element. The temperature which is required for this purpose depends to a significant extent on the catalytic coatings used and/or the particulates to be converted. Suitable heating elements are in particular metallic honeycomb bodies which are provided with a voltage source. These can significantly increase the temperature of the exhaust gas for a short time and even under high dynamic loads.

In accordance with again an added feature of the invention, the catalytic converter includes at least one conical honeycomb structure. This converter, which is provided with an SCR catalyst, generally requires a relatively large surface area for virtually complete conversion of the nitrogen oxides. For this reason, it is particularly important for the catalytic converter to be disposed in a space-saving way in the region close to the engine or in the underbody of a passenger automobile. The use of conical honeycomb structures makes it possible, for example, to employ the entry connection pieces or exit connection pieces of exhaust pipes, so that these parts of the exhaust pipe are likewise utilized for the catalytic reaction.

In accordance with a concomitant feature of the invention, there is provided a catalyst carrier which promotes the oxidation of the exhaust gas and is disposed upstream of the reducing agent feed. A heating element, which preferably forms a structural unit with the catalyst carrier, is preferably connected downstream of the catalyst carrier.

Other features which are considered as characteristic for the invention are set forth in the appended claims, reciting refinements which can be integrated in the exhaust gas system individually or in combination with one another in order to improve the reduction of pollutants.

Although the invention is illustrated and described herein as embodied in an exhaust gas system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram showing the structure of an exhaust gas system;

FIG. 2 is a diagrammatic and partly broken-away sectional view of a structural unit made of a catalyst carrier and heating element;

DESCRIPTION OF THE PREFERRED EMBODIMENTS

Figure 3:
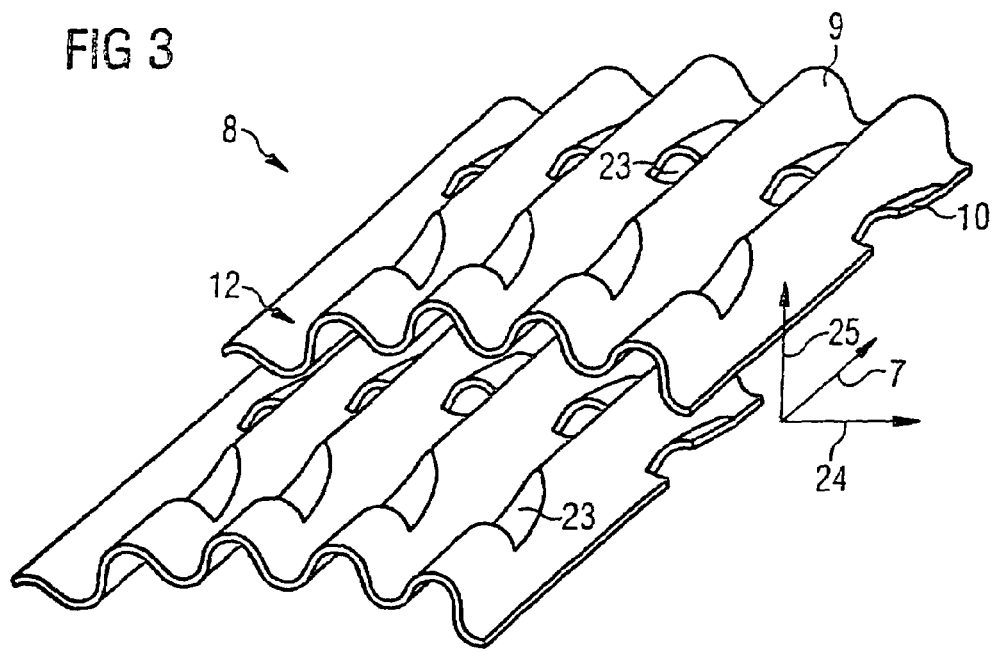
FIG. 3 is an enlarged, fragmentary, perspective view of layers of a honeycomb body of a mixer.

Referring now to the figures of the drawings in detail and first, particularly, to FIG. 1 thereof, there is seen an illustration of an exhaust gas system 1 for converting pollutants in an exhaust gas from a mobile internal combustion engine 2. The illustrated embodiment shows a number of specific configurations of components used for the conversion. The advantages referred to above may also be realized individually. As is seen in a flow direction 7 of the exhaust gas, the internal combustion engine 2 is followed first of all by a primary catalytic converter 17, which is preferably connected downstream of but relatively close to the engine. The primary catalytic converter 17 in particular performs the function of starting the conversion of pollutants even during the cold-start phase. It is able to do so because the exhaust gas emitted by the internal combustion engine 2 is relatively hot.

Downstream of the primary catalytic converter 17 is a structural unit made up of a catalyst carrier 16 and a heating element 14. This structural unit is explained in more detail below with reference to FIG. 2.

A reducing agent, in particular solid urea, which is used to reduce nitrogen oxides, is introduced into an exhaust pipe 6 with the aid of a reducing agent feed 3, at a location downstream of the heating element 14 and upstream of a filter element 5. The filter element 5 is represented in this case by a plurality of disk-like, in particular metallic, honeycomb bodies. In the illustrated exemplary embodiment, a reducing agent feed 3 is not provided only upstream of the filter element 5, but instead reducing agent is additionally supplied downstream of the filter element 5 (for example in liquid and/or gas form). The exhaust gas which has been provided with the reducing agent then comes into contact with a mixer 11, which effects a final fine distribution of reducing agent droplets or particles in the exhaust gas. The exhaust gas which has been pretreated in this way then comes into contact with a catalytic converter 4, which in this case has a conical honeycomb structure 15 on an exhaust-gas inlet side. The pollutants in the exhaust gas are converted with the aid of the catalytic converter 4. This is true in particular of nitrogen oxides, which are converted by using the SCR process.

FIG. 2 diagrammatically illustrates a sectional view through the structural unit made up of the catalyst carrier 16 and the heating element 14. The configuration of these components is selected to be such that the heating element 14 is connected downstream of the catalyst carrier 16, as seen in the flow direction 7 of the exhaust gas. The catalyst carrier 16 includes a tubular casing 18, in the interior of which a multiplicity of sheet-metal layers 9 are disposed. These sheet-metal layers are structured and/or wound together in such a way as to form passages 13 through which an exhaust gas can flow.

The heating element 14 is secured to a downstream end side of the catalyst carrier 16. This is done by pins 19, which are disposed on the outside of the tubular casing 18 of the catalyst carrier 16 or extend into inner regions. Due to the fact that the heating element 14 is electrically heated, the pins 19 are provided with an insulation 20, preventing electrical contact with the catalyst carrier 16. The illustrated heating element 16 likewise has a multiplicity of sheet-metal layers 9 which form passages 13 through which the exhaust gas can flow and which are preferably disposed parallel to the flow direction 7 of the exhaust gas. The exhaust pipe 6 has terminals 21, through which electrodes 22 extend in electrically insulated form, for the supply of current. The heating element 14 can be supplied with direct current or alternating current via the electrodes 22.

FIG. 3 shows portions of sheet-metal layers 9 which have microstructures 10 and form a honeycomb body 8. These configurations of sheet-metal layers 9 or honeycomb structures 8 can be used in particular as the mixer 11. The microstructures 10 are, for example, a plurality of openings 23 and guiding surfaces 27 (see FIG. 4), which ensure intensive mixing or combining of reducing agent and the exhaust gas. The sheet-metal layers 9 have a coating 12 which can be selected differently depending on the intended use of the mixer 11 and/or its position in the exhaust gas system. The microstructures 10 are disposed in such a way that the exhaust gas or reducing agent, which preferably flows in the flow direction 7, is also diverted in the transverse direction 24 and/or radial direction 25.

Figure 4:
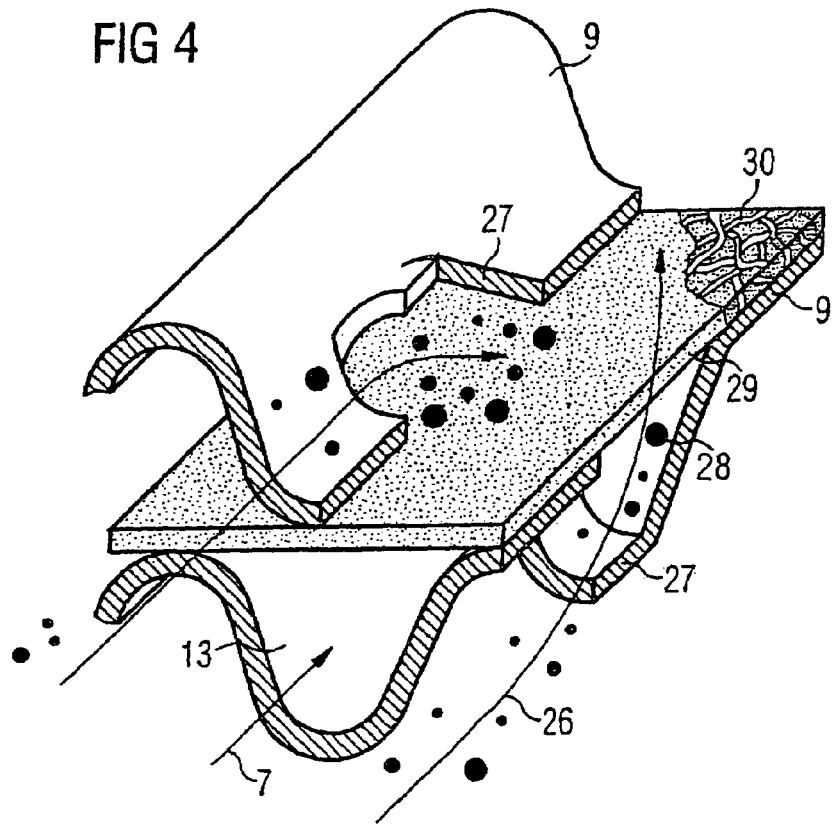
FIG. 4 is a further enlarged, fragmentary, perspective view of a filter element.

FIG. 4 shows a fragmentary view of a filter element 5. The filter element 5 once again includes a plurality of at least partially structured sheet-metal layers 9 which form passages 13 through which the exhaust gas can flow. The exhaust gas has a multiplicity of particulates 28, which follow a path 26 substantially parallel to the flow direction 7 of the exhaust gas. The microstructures 10 (see FIG. 3) or guide surfaces 27 divert the particulates 28 toward an intermediate layer 29. This intermediate layer 29 may also be constructed as an uncoated metallic sheet-metal layer 9, but in this illustrated case it is an intermediate layer 29 formed from fibers 30. This intermediate layer 29 that is formed of fibers 30 preferably has a coating which, for example, promotes selective catalytic reaction. If the intermediate layer has a low porosity (approximately 50%), the guide surfaces 27 are preferably constructed to be small, so that on one hand sufficient (carbon) particulates 28 are filtered out of the exhaust-gas stream, but on the other hand a relatively unimpeded flow of the reducing agent/exhaust gas mixture through the filter element 3 is also ensured. However, it is also possible for the filter layer or the intermediate layer 29 provided with fibers to be made relatively permeable, i.e. to be provided with a very high porosity, in particular in the range of from 75 to 90%. As a result, the reducing agent particles, which have been finely distributed, can pass through a filter layer of this type or can be successfully accumulated there, and can therefore display or realize their effect either in the coated intermediate layer 29 itself or on, or in, the downstream SCR catalytic converter.

The exhaust gas system proposed herein is distinguished by particularly high conversion rates at relatively low production costs. This concept is in particular easy to integrate in existing exhaust gas systems.

We claim:

1. An exhaust gas system for converting pollutants in an exhaust gas from a mobile internal combustion engine, the exhaust gas system comprising:
    an exhaust pipe conducting the exhaust gas from the mobile internal combustion engine in an exhaust gas flow direction;
    a reducing agent feed opening into said exhaust pipe;
    a filter element connected in said exhaust pipe downstream of said reducing agent feed, in said exhaust gas flow direction, said filter element constructed for creating a dynamic pressure upstream of said filter element thereby causing a distribution of reducing agent over a cross section of said filter element;
    a catalytic converter connected in said exhaust pipe downstream of said filter element, in said exhaust gas flow direction;
    a catalyst carrier disposed upstream of said reducing agent feed and promoting oxidation of the exhaust gas; and
    a heating element coupled downstream of said catalyst carrier.

2. The exhaust gas system according to claim 1, wherein said reducing agent feed is a delivery device for introducing solid urea into said exhaust pipe.

3. The exhaust gas system according to claim 1, which further comprises at least one metallic honeycomb body having at least partially structured sheet-metal layers, at least some of said sheet-metal layers having microstructures.

4. The exhaust gas system according to claim 1, wherein said filter element is metallic and uncoated.

5. The exhaust gas system according to claim 1, which further comprises a heating element disposed upstream of said reducing agent feed, in said exhaust gas flow direction.

6. The exhaust gas system according to claim 1, wherein said catalytic converter includes at least one conical honeycomb structure.

7. The exhaust gas system according to claim 1, wherein said heating element and said catalyst carrier together form a structural unit.

8. The exhaust gas system according to claim 1, which further comprises another reducing agent feed opening into said exhaust pipe downstream of said filter element.

9. The exhaust gas system according to claim 1, wherein said filter element includes a plurality of disk-shaped honeycomb bodies.

10. The exhaust gas system according to claim 9, wherein said honeycomb bodies are metallic.

11. The exhaust gas system according to claim 1, which further comprises at least one mixer disposed at least one of upstream and downstream of said filter element, in said exhaust gas flow direction.

12. The exhaust gas system according to claim 11, wherein said at least one mixer is disposed downstream of said reducing agent feed.

13. The exhaust gas system according to claim 11, wherein said at least one mixer is formed of a material able to withstand high temperatures and is uncoated.

14. The exhaust gas system according to claim 11, wherein said at least one mixer is formed of a material able to withstand high temperatures and has a coating promoting hydrolysis.

15. The exhaust gas system according to claim 11, wherein said at least one mixer is formed of a material able to withstand high temperatures and has a coating suitable for selective catalytic reaction.

16. The exhaust gas system according to claim 11, wherein said at least one mixer has at least partially structured sheet-metal layers forming passages being open to permit exhaust gas to flow through said passages.

* * * * *